United States Patent
Clark et al.

(10) Patent No.: US 9,613,322 B2
(45) Date of Patent: Apr. 4, 2017

(54) DATA CENTER ANALYTICS AND DASHBOARD

(71) Applicant: Orbis Technologies, Inc., Annapolis, MD (US)

(72) Inventors: David Clark, Annapolis, MD (US); Ari Blenkhorn, Annapolis, MD (US)

(73) Assignee: Orbis Technologies, Inc., Annapolis, MD (US)

( * ) Notice: Subject to any disclaimer, the term of this patent is extended or adjusted under 35 U.S.C. 154(b) by 416 days.

(21) Appl. No.: 14/243,503

(22) Filed: Apr. 2, 2014

(65) Prior Publication Data

US 2014/0297569 A1   Oct. 2, 2014

Related U.S. Application Data

(60) Provisional application No. 61/807,534, filed on Apr. 2, 2013.

(51) Int. Cl.
*G06Q 10/00* (2012.01)

(52) U.S. Cl.
CPC .................. *G06Q 10/00* (2013.01)

(58) Field of Classification Search
None
See application file for complete search history.

(56) References Cited

U.S. PATENT DOCUMENTS

| | | |
|---|---|---|
| 6,976,170 B1 | 12/2005 | Kelly |
| 7,505,868 B1 | 3/2009 | Shan |
| 7,809,696 B2 | 10/2010 | Harush |
| 8,046,385 B2 | 10/2011 | Wald et al. |
| 8,060,502 B2 | 11/2011 | Churi et al. |
| 8,364,519 B1 | 1/2013 | Basu et al. |
| 2008/0255696 A1 | 10/2008 | Chaar et al. |
| 2010/0094858 A1 | 4/2010 | Indeck et al. |
| 2010/0114899 A1 | 5/2010 | Guha et al. |
| 2011/0282860 A1 | 11/2011 | Baarman et al. |
| 2012/0137367 A1 | 5/2012 | Dupont et al. |

OTHER PUBLICATIONS

International Search Report for PCT/US2014/032695 dated Aug. 27, 2014, 18 pages.

*Primary Examiner* — Alan Chen
(74) *Attorney, Agent, or Firm* — Edell, Shapiro & Finnan, LLC

(57) ABSTRACT

A method and system to evaluate data efficacy across an enterprise is disclosed. The method includes the step of indexing a set of data sources that include at least one of structured and unstructured data artifacts. The method further includes accessing the indexing on the one or more data sources with a computer. The method further includes the step of generating a plurality of analytics about the data sources based on the indexing, wherein the analytics include a plurality of: a document originality analytic, a corpus storage volume analytic, a data source ingest analytic, a document type analytic, and an analysis analytic. The method further includes displaying, on a display device, an interactive visualization of results based on the analytics, wherein the visualization comprises at least one of: a histogram, a graph, a timeline, a panel, a list, a chart, a popup, and a table.

18 Claims, 9 Drawing Sheets

DATA CENTER ANALYTICS AND DASHBOARD

CROSS REFERENCE TO RELATED APPLICATIONS

The present application claims priority benefit under 35 U.S.C. §119(e) of U.S. Provisional Patent Application No. 61/807,534 entitled "Data Center Analytics and Dashboard," filed Apr. 2, 2013, the contents of which are incorporated herein by reference in their entirety.

TECHNICAL FIELD

The present invention relates to systems and methods to generate and display analytics for enterprise data spread across one or more data sources.

BACKGROUND

Organizations often have multiple systems that store and process the same or similar data. However, this is expensive for organizations in terms of maintaining the disparate systems, and there may be data synchronization issues, such as using an outdated customer address in one system even though the current address is persisted in a different system. Additionally, an organization may be forced to spend money on hardware that is not required due to the proliferation of duplicate data.

In most organizations, users' desktop and mobile computing environments often contain multiple files containing the same or similar data with different names. Having this data duplication is sometimes intentional to preserve data lineage, such as in compliance situations, but is also accidental in some cases. Using resources to store unneeded data often results in incurring costs to replace or augment a user's computing environment before the serviceable life of the computing environment is met.

Many organizations provide enterprise storage systems for their users to manage documents that have enterprise value. Some examples of these enterprise systems include shared file systems, document management systems, content management systems, mobile drop box access, and others. Multiple users often contribute the same or similar documents to be persisted on their behalf in these enterprise systems. This results in increased storage requirements for storing the same or similar data.

Also, large organizations often lack the ability to discover collaborative opportunities that exist outside defined processes.

SUMMARY OF THE INVENTION

To overcome the problems described above, a data center analytics and dashboard is disclosed that significantly increases the ease and efficiency of making business decisions based on semantic analysis of the enterprise content spread across one or more data sources. Such an approach provides a view of several high-level key indicators and summary analytics associated with the data (storage, originality, source, key relationships, date and time of origin, etc.). The analytics are presented in an immediately intuitive and visual way on a dashboard. The dashboard user interface (UI) enables rapid high-level assessment of quality and quantity analytics of unstructured, semi-structured and structured data sources. The approach provides the user with the ability to discover more detailed analysis of specific performance parameters.

In one embodiment, a graphical representation of the relative value of data in an enterprise storage solution is provided. Such a representation may enable an enterprise to determine in which systems to prioritize maintenance resources. The relative value can be determined through a variety of analytics designed to explicitly illustrate artifact or document originality, derivation of content, correlations across data sources, use of data sources, the impact of text analytics and semantic markup on enterprise storage and processing, and similar analytics. Such a solution can provide a quick and easy way to assess the value of the data, and subsequently, the most efficient and cost effective enterprise data storage solution.

In another embodiment, a graphical representation of the relative value of files within a user's computing environment can enable the user of a computing environment and the group responsible for managing the computing environment to more efficiently store the needed data without using resources for extraneous data.

In yet another embodiment, a graphical representation of the relative value of documents within an enterprise storage system can enable the managers of the system to more efficiently manage storage requirements, and alert users of similar content.

In one embodiment, a graphical representation of the relative value of data across an enterprise, which includes the use of data by multiple users across different defined processes in an organization, can be used to enable an organization to discover opportunities for collaboration to possibly innovate an organization's products or services, or to become more operationally efficient in providing the products or services. For example, if multiple users are maintaining the same information about manufacturing data, possibly one from a regulatory affairs perspective and another from quality assurance perspective, a graphical user interface depicting the relative value of this data as determined by a set of analytics, can provide the organization's management needed data to establish a collaborative process between these two groups of users. The discovered collaboration opportunity could lead to decreased costs, as well as discovering ways to innovate manufacturing or delivery of the product.

In exemplary embodiments, a data quality analytics (DQA) system according to the present invention provides a dashboard and analytics system to evaluate data efficacy across disparate data sources using multiple analytics, including but not limited to document originality, corpus storage volume, data source ingest timeline, document type, and analysis.

In some embodiments, a DQA system according to the present invention enables more efficient storage management requirements, and alerts user of similar content. For example, if multiple users are maintaining the same information about a particular target, a graphical user interface depicting the relative value of this data, as determined by a set of analytics, would provide the organization's management needed data to establish a collaborative process between these two groups of users, which could lead to decreased costs, as well as discovered ways to innovate manufacturing or delivery of the product.

In some embodiments, a DQA system according to the present invention leverages semantic text analytics incorporating Natural Language Processing (NLP) algorithms (machine learning and evidential reasoning), for example, in a Hadoop cloud processing environment. For example, the analytics component may analyze the content of the data source to determine the level of similarity between one set of data and data.

Analytics are used in a DQA system according to the present invention to evaluate the efficacy of data across an enterprise, and is based on common data governance ideals such as data lineage, pedigree, and provenance.

In some embodiments, a document originality analytic evaluates the originality of data within a corpus of documents. The analysis is based on two concepts: exact text match, wherein the same or similar text is used, and similar facts, wherein different text describes the same facts. Original data may be considered as higher value, as this analytic may represent uniqueness of data across the enterprise. This analytic also captures document originality by document type using document metadata; originality by document age using metadata depicting the date a document was created; and, originality by document size, which evaluates the number of sentences as compared to the number of original sentences.

In other embodiments, the data source ingest timeline analytic identifies the volatility of data. High volatility data, such as stock price data, holds little value over time, but is of high value at the current time. Volatile data may also hold high value for trend analysis. The data source ingest timeline analytic may identify growth in ingest and/or update rates that may identify a systemic problem, such as quality decrease in initial document versions, or an infrastructure concern, such as change in storage system utilization estimates.

In some embodiments, the document type analytic uses document metadata to analyze the types of documents in a corpus, and provide metrics depicting the number of documents of each type in the corpus. This can be used to identify the value of data based on the type of document, as some document types may be of higher value to users than other types of documents.

In other embodiments, the corpus storage volume analytic provides metrics on the relative value of data based on facts extracted from documents versus facts inferred from documents using models, logic, or rules. This analytic captures the value of data that is inferred from cross-document correlation based on models and logic. This analytic also computes the total disk storage required for facts extracted from the document as well as inferred using models, logic, or rules. The analytic also computes the number of sentences in each document. This enables the capability to view the amount of storage required by document size; i.e. number of sentences, which is useful in determining storage requirements by document size.

In some embodiments, the analysis analytic identifies the top entity-to-entity relationships across a set of data sources. This may be useful in determining the value of data that is extracted from a corpus of documents or inferred from across enterprise data sources using models, logic, and rules. The analysis analytic also may identify the top entities and top sentences across unstructured text sources, as well as the top documents based on derived content analysis. In this analysis, each document may be compared for similarity and derived content is determined by comparing document create and/or modified dates. Content is considered derived when a document age is newer than an older document with similar content.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
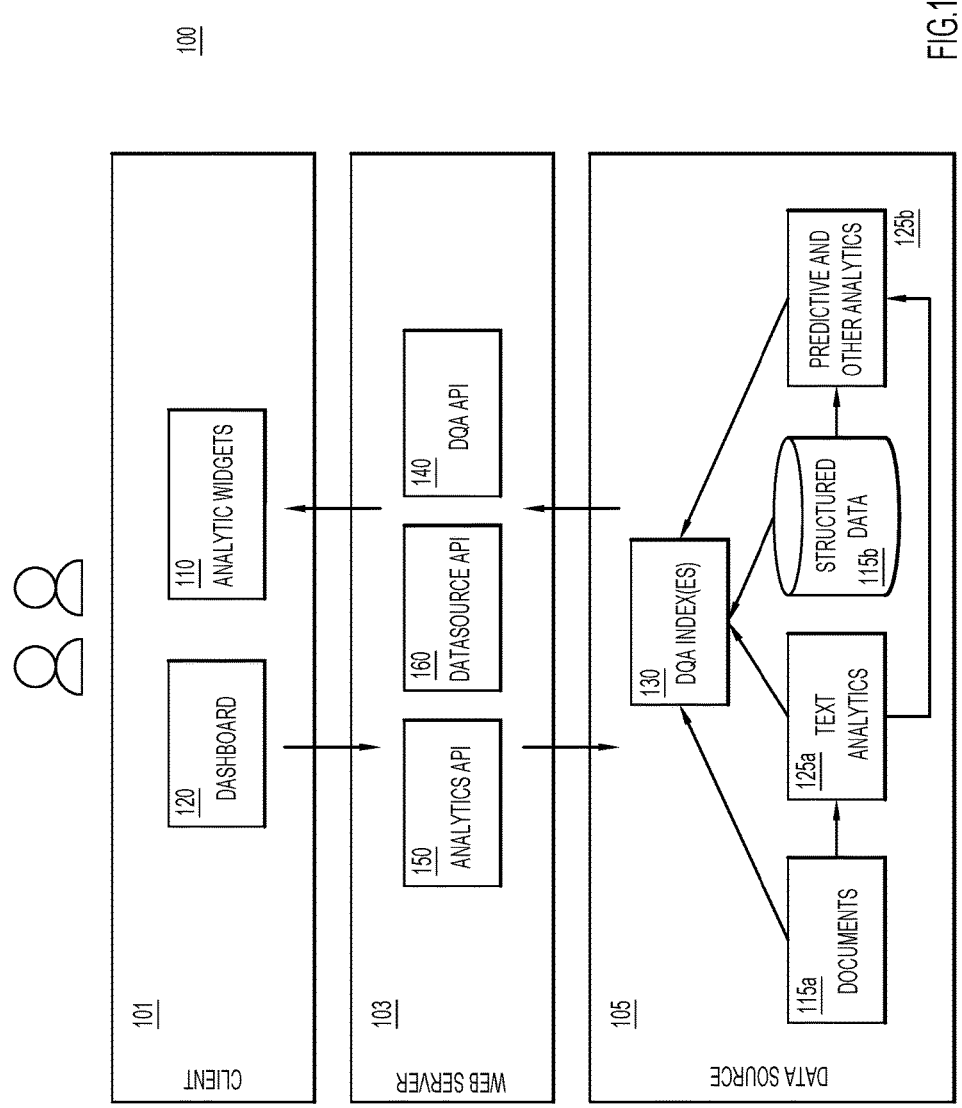
FIG. 1 is a block diagram illustrating the architecture to support a data center analytics and dashboard, according to some embodiments of the present invention.

FIG. 1 is a block diagram illustrating a data quality analytics ("DQA") system 100 according to some embodiments of the present invention. In the embodiment shown, the DQA system 100 includes client components 101, web server components 103, and data source components 105. Examples of client components include analytics widgets 110 and a dashboard 120. Examples of web server components include a DQA application programming interface ("API") 140, an analytics API 150, and a datasource API 160. Examples of data source components include documents and structured data 115*a* and 115*b*, respectively, text analytics and predictive and other analytics 125*a* and 125*b*, respectively, and DQA index(es) 130.

Figure 9:
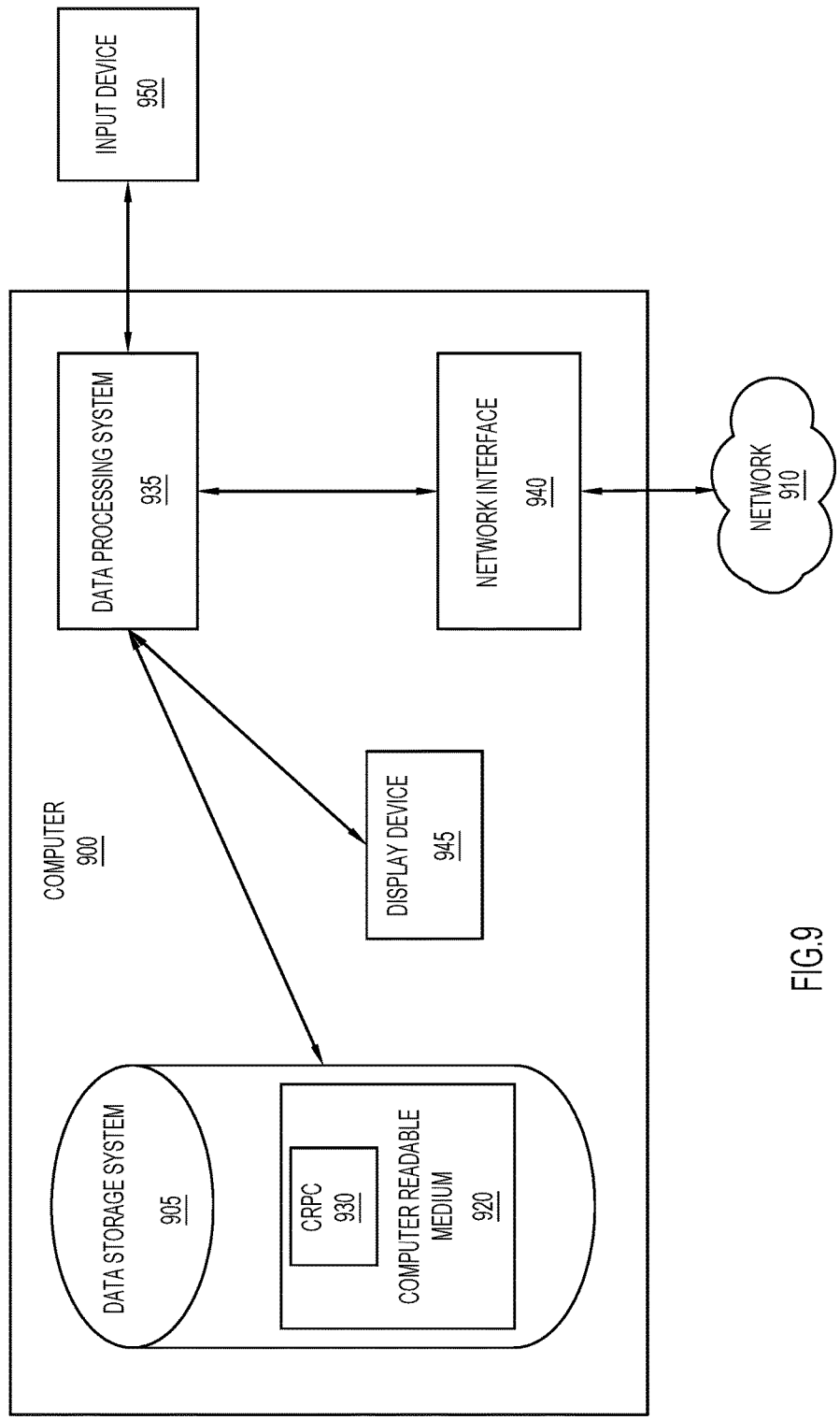
FIG. 9 is a schematic drawing showing an exemplary implementation of the present invention using a networked computer.

A client may interact with the DQA system 100 using client components 101, including analytics widgets 110 and dashboard 120. On the backend, the DQA system 100 may consist of one or more servers, computers, and network devices to operate the DQA indexing and analytics component 130, the DQA API 140, and the DQA Dashboard 120. Examples of such servers and/or computers configured to implement DQA are depicted in FIG. 9, described below.

At the data source level, the DQA indexes 130 perform the analysis to generate analytics on data source components 105, which may include unstructured text data sources 115a, structured data sources 115b, and other data sources such as, for example, Hadoop cloud-based data sources. There may be additional analytics 125 derived from data sources 115 using analytics 125 that already exist in an enterprise, such as predictive analytics 125b, text analytics 125a, and others. Such analytics, such as predictive analytics 125b and text analytics 125a, may be used in conjunction with the analytics generated through the DQA indexes 130, The DQA Indexes 130 do not have to be installed on the same server as the data sources 115, but must have accessibility to the data, such as via a communications network through a network interface.

The DQA API 140 allows the DQA dashboard 120 to access the results or analytics from the DQA indexes 130 and other analytics 125 over the data sources 115. The dashboard 120 is configurable to access existing analytics clients 125 within an enterprise (e.g., predictive 125b, text 125a, etc.) to supplement the analytics from the DQA indexes 130 and optionally provide drill-down details. The drill-down within the dashboard 120 can also access the data directly from the data source components 105. To support this direct access, the dashboard 120 must have access to existing analytics clients 125, existing analytics APIs 150, and Datasource APIs 160 (e.g., JDBC for an RDBMS, a document repository API such as WebDAV, etc.).

In one embodiment, a DQA system according to the present invention may be used to for cloud analytics. In such embodiments, the application layer with dashboard 120 and analytics widgets 110 may use Ozone Widget Framework (OWF) based UIs. The interface layer with analytics API 150, datasource API 160, and DQA API 140 may use the Unstructured Information Management Architecture (UIMA) framework and the APIs required for the metadata generated from the cloud analytics and data services. Additionally, the data sources 115 may include Amazon Web Services, Army cloud "Red Disk" infrastructure, and enterprise cloud infrastructure deployed in an Amazon Web Services environment.

Figure 2:
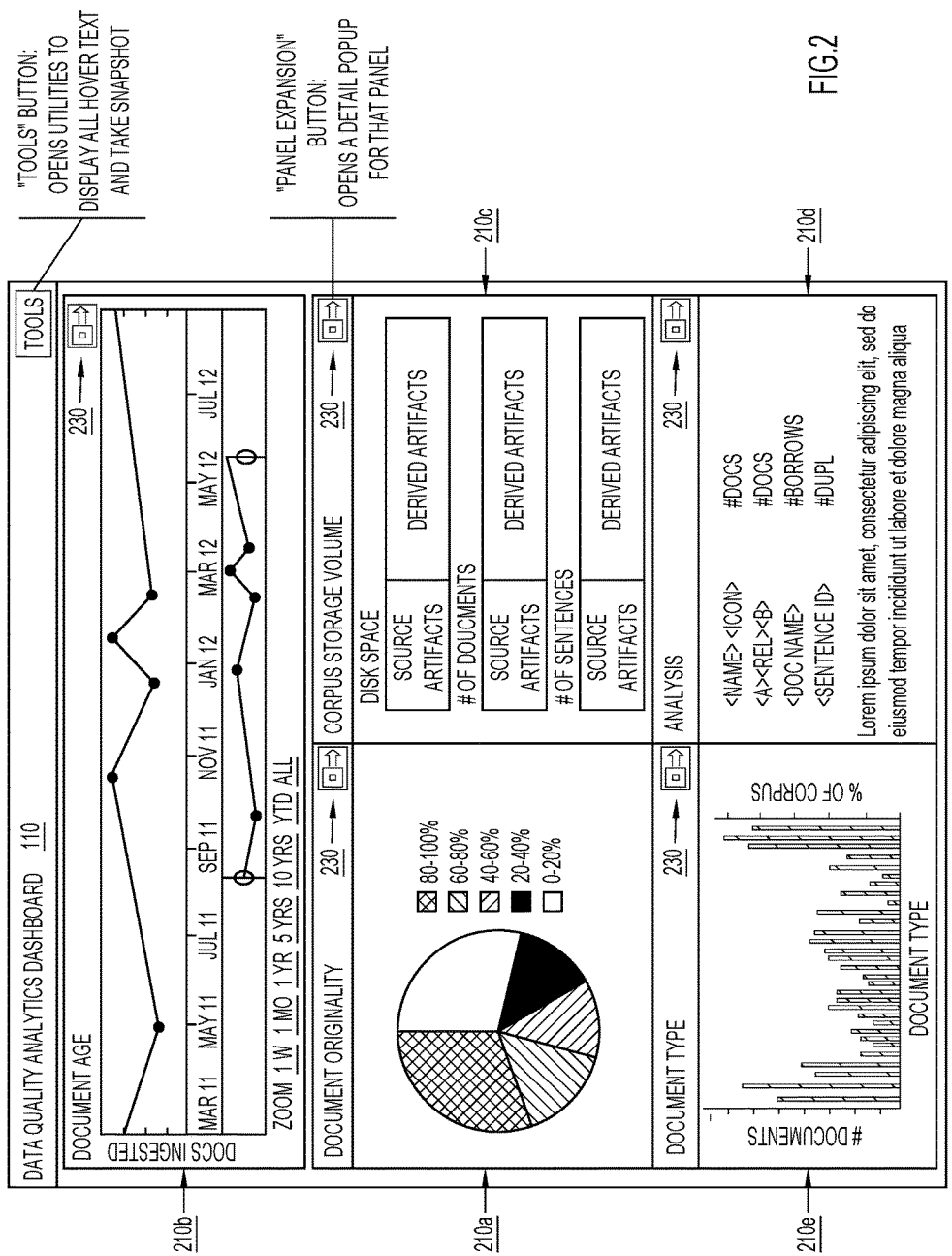
FIG. 2 is a block diagram illustrating a data quality analytics dashboard, according to some embodiments of the present invention.

FIG. 2 is a block diagram illustrating a data quality analytics dashboard, according to some embodiments of the present invention. The data center analytics dashboard 110 provides at-a-glance results of the analytics generated, for example, using the DQA indexes 130 and optionally the existing analytics clients 125. The dashboard 100 may be displayed as part of a graphical user interface (GUI) on a display device coupled to a computer, and a user may interact with the dashboard using an input device or interface, such as a mouse, keyboard, or microphone. The computer may be connected, via a communications network, to the DQA system 100 through client components 101, or the computer may optionally host the DQA system 100.

In some embodiments, the dashboard 110 may be configurable by a user based on the analytics deployed and user preference. For example, if a data originality analytic was deemed as most important to a user, the dashboard 110 could be configured such that the pie chart or other visualization depicting a data originality analytic in data originality panel 210a, as depicted in FIG. 2, could be placed at the top of the dashboard 110 to represent its importance.

The dashboard 110 also may display hover text in the GUI to provide additional information about each analytic result, as well as drill-down capabilities. The "Tools" button 220 in the upper-right of the main dashboard window 110 gives the user the capability to, using an input device, display all hover text for each panel 210 and take a snapshot of all analytics results with or without the hover text. The "Panel Expansion" button 230 allows the user to see details of the results of each analytic supporting the visualization in that panel 210. Visualizations for most analytics can be configured by the user. For example, for data age analytics results 210b, the user could choose a timeline to see the amount of data that existed at a certain time; or a histogram to show the average amount of data for some time group, such as a 3-month span; or a pie chart to show the percentage of data age for a collection of data, such as a corpus of documents; or, a bar to show the percentage of a specific group of data with the same age range in context to all data's age ranges. Panels 210 may be displayed for any number of analytics, including one or more of a document originality analytic panel 210a, a document age analytic panel 210b, a corpus storage volume analytic panel 210c, an analysis analytic panel 210d, and a document type analytic panel 210e.

Figure 3:
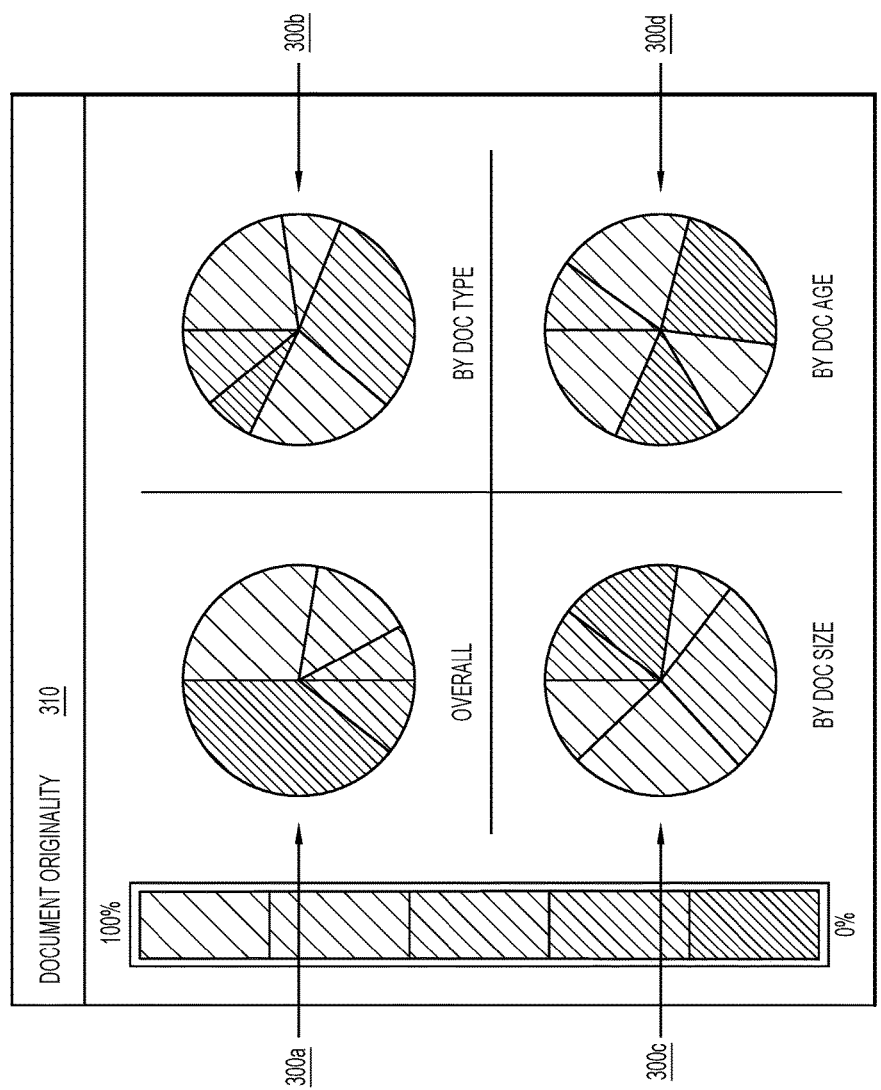
FIG. 3 is a block diagram illustrating a visualization of combined analytics, according to some embodiments of the present invention.

FIG. 3 is a block diagram illustrating a visualization of combined analytics, according to some embodiments of the present invention. In some embodiments, analytics results can be combined, and the combined result may be displayed on a GUI on a display device of a computer. The combined result may include a series of panels 300a-d that depict one or more visualizations of one or more analytics. For example, the combined result may include different visualizations or panels of a document originality analytic. A user may further interact with the visualization using an input device and select a panel expansion button 230 of document originality panel 210a to create a document originality popup window 310. FIG. 3 depicts one embodiment where a data originality analytic popup 310 for a corpus of documents is further analyzed by document metadata from a second analytic, including overall corpus originality 300a, document type corpus originality 300b, document size corpus originality 300c, and document age corpus originality 300d, which is visualized in a pop-up document originality analytic panel 310.

In some embodiments, one or more data or document originality analytics may be derived from multiple algorithms running, in for example, MapReduce, to calculate the originality of the data artifacts or documents within the data source 115 corpus. The data originality calculation may be based on two algorithms: 1) an exact match of the text, wherein the same or similar text is used; and 2) the identification of similar facts, wherein different text describes the same facts (entities and relations). In the calculation of originality, original data may be considered as higher value, as this content represents uniqueness of this data across the enterprise. The data originality analytic also may take into account document originality by document type using document metadata. For example, document originality can take into account the document age using metadata representing the date a document was created. Additional metadata can further be generated showing the document size and the number duplicate sentence as compared to the number of original sentences.

Figure 4:
FIG. 4 is an illustrative workspace window generated by a data quality analytics dashboard, according to some embodiments of the present invention, including a notational list of data sources (including documents) that match drill down criteria.

FIG. 4 is an illustrative workspace window generated by a data quality analytics dashboard, according to the present invention, including a notational list of documents that match drill down criteria. The dashboard 110 may display analytics in a GUI and further provide a drill down feature for each analysis area. For example, the dashboard 110 may include a visualization of documents 410 that includes the name of a document and a percentage indicating the originality of the document. There may be further drill-down criteria, for example, that may be optionally selectable by a user operating an input device. Such a drill-down would enable a user to select a specific analysis segment, such as documents that are between 80-100% original in analytics panel 210a in FIG. 2. In response to the input from the user, the dashboard 110 may provide a popup visualization listing 410 of all documents in a corpus that match the criteria, as depicted in FIG. 4. Drill downs may be available for all analytics, such as document age, size, and type.

Figure 5:
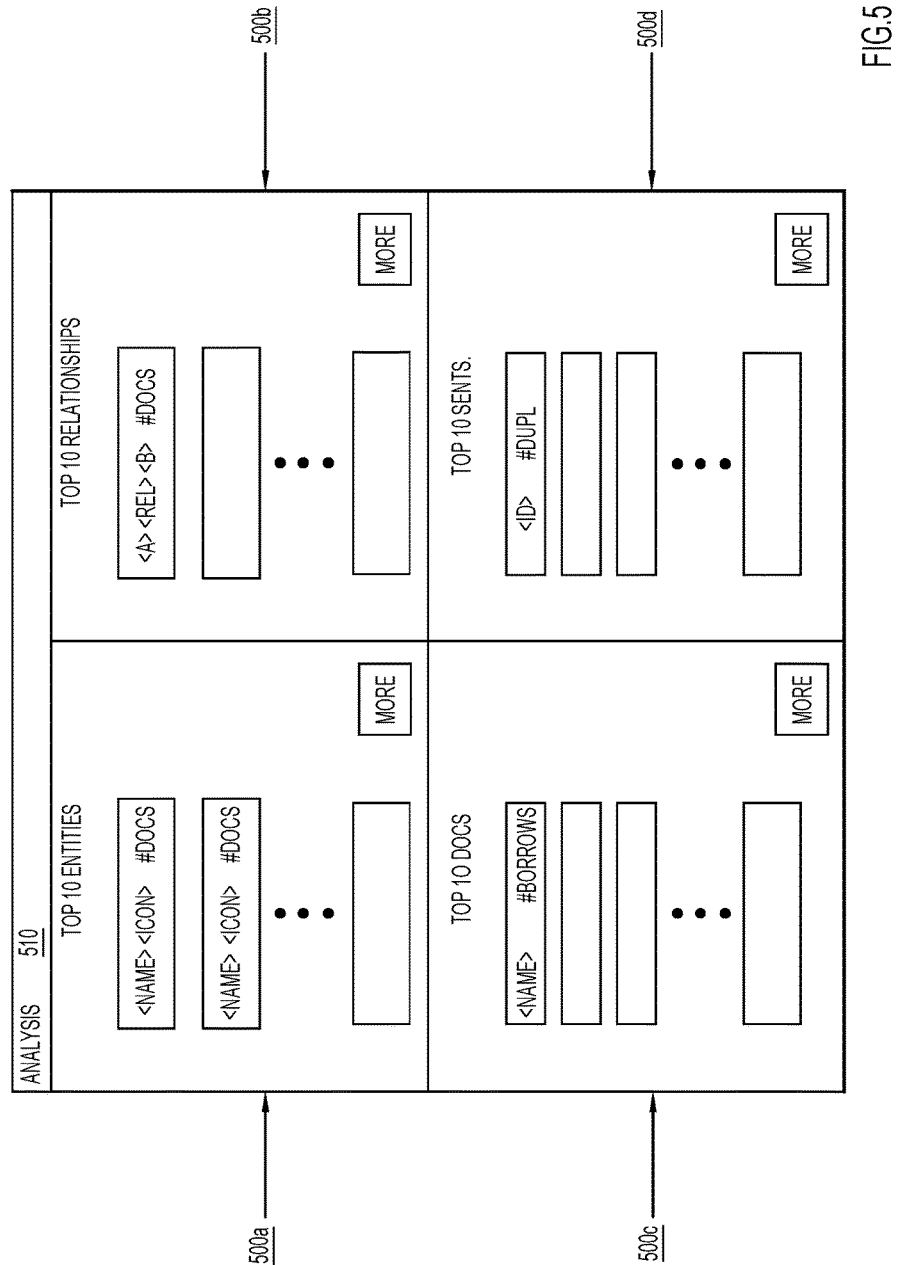
FIG. 5 is a block diagram illustrating an analysis results table, according to some embodiments of the present invention.

FIG. 5 is a block diagram illustrating an analysis results table, according to some embodiments of the present invention. In some embodiments, the dashboard 110 may display an analytic as part of a table visualization on a GUI of a display device. In the embodiment disclosed shown in FIG. 5, upon receiving an input from an input device to select panel expansion button 230, an analysis analytic panel 210d may provide an analysis popup 510 that depicts details for the top entities 500a, top relationships 500b, top documents based on derived content 500c, and the top sentences 500d, with some number of top listings, such as top 10 as depicted in FIG. 5. The analysis results popup 510 may display one or more visualizations of aspects of an analysis analytic as part of a list. The lists of the analysis results popup table 510 may optionally provide the rank as defined by the analytic and the number of documents containing an entity, relationship, or sentence based on the analytic, or the page rank based on the number of borrows by other documents in a corpus. Selecting one of the top sentences in list 500d, relationships in list 500b, or entities in list 500a may optionally provide another popup that lists all documents that contain the sentence, relationship, or entity.

In some embodiments, the analysis dashboard element depicted in FIG. 5 may be generated from a DQA system 100 running multiple NLP algorithms that extract entities, relationships and other text metadata to assist in the computations to determine similarity. Such semantic text analytics may support corpus analysis. For example, the DQA system 100, and specifically the indexes 130, may leverage semantic text analytics to identify top entity-to-entity relationships across a corpus. This may be useful in determining the value of data that is extracted from a corpus or inferred from cross-document correlation using models, logic, and rules that may be stored in DQA indexes 130. Semantic text analytics may also be leveraged to identify top entities and top sentences across all documents in a corpus, as well as the top documents based on derived content analysis. In this analysis, each document may be compared for similarity, and derived content is determined by comparing document create and/or modified dates. Content is considered derived when a document age is newer than an older document with similar content.

Figure 6:
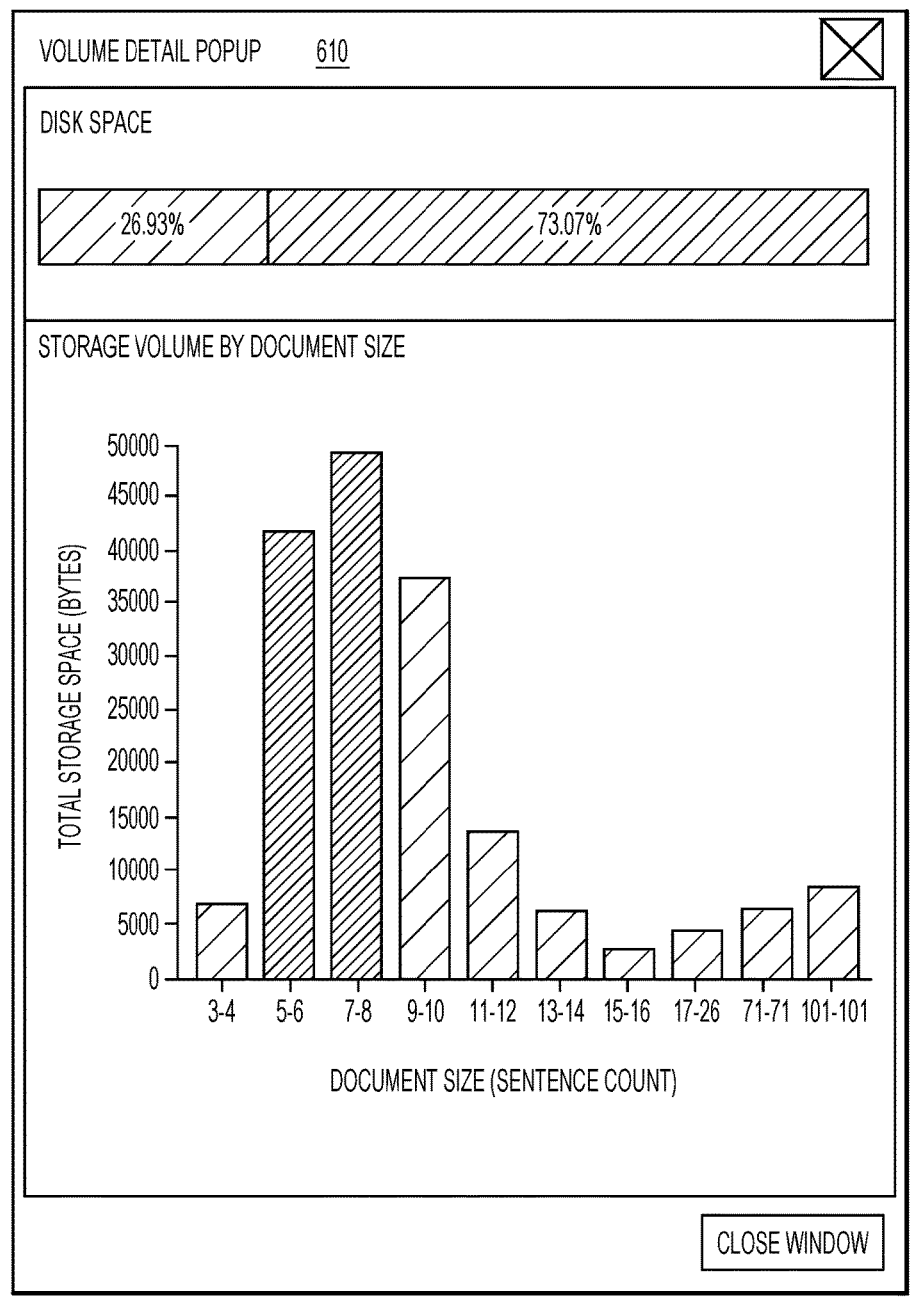
FIG. 6 is an illustrative workspace window generated by a data quality analytics dashboard, according to some embodiments of the present invention, including a corpus a storage volume detail popup.

FIG. 6 is an illustrative workspace window generated by a data quality analytics dashboard, according to the present invention, including a corpus a storage volume detail popup. A user may interact with a dashboard 110 displayed in a GUI on a display device using an input device, and may select panel expansion button 230 of the corpus storage volume panel 210c using the input device to generate a corpus storage volume panel popup 610. The corpus storage volume panel popup 610 may provide a graphical visualization of the results of a corpus storage volume analytic, specifically depicting the percentage of storage required for a corpus based on extracted facts versus inferred facts. For example, the corpus storage volume analytics may provide metrics based on the relative value of data based on facts extracted from one or more data sources versus facts inferred from data sources using models, logic, or rules. Drill downs on the corpus storage volume provide statistics on the total storage required for the data source size groups, such as depicted in FIG. 6. This provides a relative value and/or cost of an enterprise data source based on the size of data.

Duplication of data across data sources 115 may result in computationally intensive algorithms running unnecessary computations across the duplicate data. Inefficient data management results in higher sustainment costs. For example, unneeded analytics processing for duplicate data in a cloud data source 115 may result in a higher replacement rate of hard drives due to excessive disk writes. As a result, one calculation of a data source storage analytic may be the computation of the total disk storage required for facts extracted from the data source as well as inferred using models, logic, or rules. In some embodiments where the data sources 115 are cloud data sources, the corpus storage volume analytic may be critical where the cloud data sources 115 contain artifacts that are both structured and unstructured. Typical intelligence data types (signals data, imagery, etc.) may contain files that are significantly larger than average documents. For example, in a multi-INT environment it is possible for less than 5% of the data to consume a majority of storage space.

Figure 7:
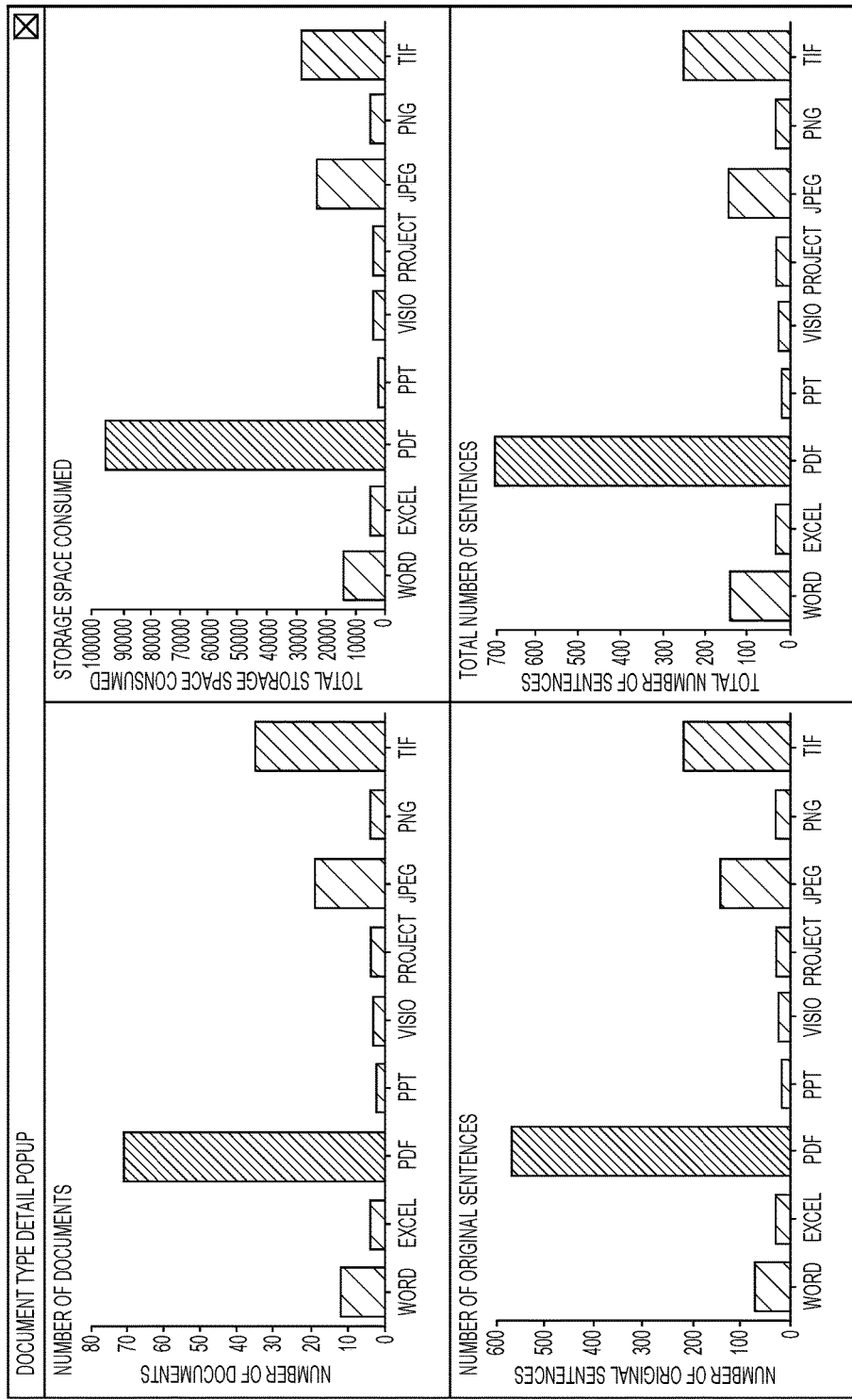
FIG. 7 is an illustrative workspace window generated by a data quality analytics dashboard, according to some embodiments of the present invention, including a document type detail popup.

FIG. 7 is an illustrative workspace window generated by a data quality analytics dashboard, according to the present invention, including a document type detail popup. A user may select, using an input device, a panel expansion button 230 of document type panel 210e displayed in a GUI on a display device to generate a document type analytic popup 710. The document type analytic popup 710 may provide at-a-glance information through a visualization of the document type analytic about the types of documents that exist in a corpus. The document type analytic popup 710 may incorporate analytics generated by the DQA system 100 that capture document metadata to analyze the types of documents in a corpus, and provide metrics depicting the number of documents of each type in the corpus. As depicted in FIG. 7, the document type detail popup 710 may provide detailed information about the total amount of storage required, the total number of sentences, and the original number of sentences for each document type. This analytic and visualization may be useful in determining the value of data for each document type, as some document types may be of higher value to users than other types of documents.

In some embodiments, the document type analytic may establish the value of a data source 115 that is being migrated to a cloud environment. The document type panel 210e and popup 710 may be viewed and used by program managers to assess the value of the contribution of a data source 115 that is contributed by an organization to a cloud. Having multiple metrics by data source 115 and by data type may create a more informed decision making process on the migration of legacy databases to a cloud storage infrastructure.

Figure 8:
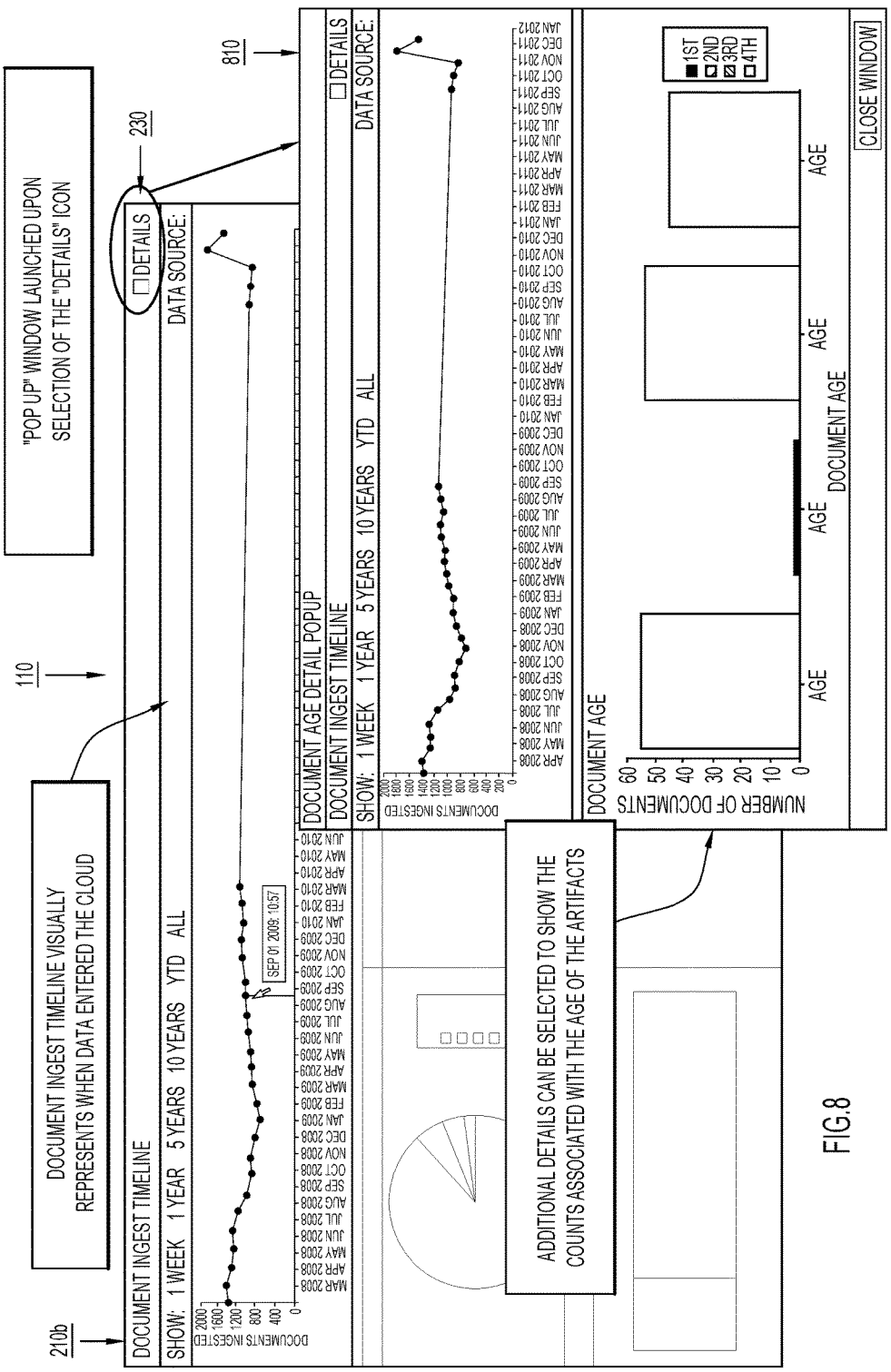
FIG. 8 is a block diagram illustrating a data source ingest timeline, according to some embodiments of the present invention.

FIG. 8 is a block diagram illustrating a data source ingest timeline, according to some embodiments of the present invention. In some embodiments, user selection of a "Details" icon 230 on Data Source Age panel 210b on Dashboard 110 using an input device may launch a data source ingest timeline pop up window 810 where additional details can be selected to show the number of data artifacts in the data source and the respective age of the artifacts. A data source ingest timeline popup 810 may be derived from analytics that highlight the metadata associated with a document or data artifact (for example, database update logs) that was derived at the time of upload or ingest into a data source. A temporal representation or visualization of the data may illustrate its high level of volatility. High volatility data, such as stock price data, holds little value over time, but is of high value at the current time. It may also hold high value for trend analysis. The data source ingest timeline popup 810 may also visualize growth in ingest and/or update rates that may identify a systemic problem, such as quality decrease in initial document versions, or an infrastructure concern, such as change in storage system utilization estimates.

FIG. 9 is a schematic drawing showing an exemplary implementation of the present invention using a networked computer. As shown in FIG. 9, computer 900 may include a data processing system 935. In some embodiments, data processing system 935 may include any number of computer processors or central processing units (CPUs), any number of which may include one or more processing cores. In some embodiments, any of the processing cores may be physical or logical. For example, a single core may be used to implement multiple logical cores using symmetric multithreading.

Computer 900 also includes network interface 940 for receiving messages (e.g., messages transmitted from a client) and transmitting messages over network 910, and a data storage system 905, which may include one or more computer-readable media 920. Computer-readable media 920 may include any number of persistent storage devices (e.g., magnetic disk drives, solid state storage, etc.) and/or transient memory devices (e.g., Random Access Memory).

Computer 900 also includes a display device 945. The display device 945 may be, for example, a monitor, touch screen, LCD screen, or any physical or virtual interface to display content. In some embodiments, the DQA dashboard 120 may be displayed on display device 945 where the invention is implemented on computer 900. The data processing system 935 of computer 900 may be connected to the display device 945, such as, for example, through a wireless or physical connection, and be configured to display the DQA dashboard 120 and the illustrative workspace windows described above. In some embodiments, display device 945 is coupled to an input device 950, such as where computer 900 is connected to an LCD screen display device 945 configured to receive input from a user.

The data processing system 935 of computer 900 may also be connected to an input device 950, which may be, for example, a keyboard, touchscreen, mouse, or voice capture device for voice recognition. In some embodiments, input device 950 may be connected to computer 900 via a network 910 and a network interface 940, and in other embodiments the input device 950 may be directly connected to the processing system 935 of computer 900, such as via a wire, cable, or wireless connection.

In embodiments where data processing system 935 includes a microprocessor, a DQA computer program product may be provided. Such a computer program product may include computer readable program code 930, which implements a computer program, stored on a computer readable medium 920. Computer readable medium 920 may include magnetic media (e.g., a hard disk), optical media (e.g., a DVD), memory devices (e.g., random access memory), etc. In some embodiments, computer readable program code 930 is configured such that, when executed by data processing system 935, code 930 causes the processing system to perform steps described above.

In other embodiments, computer 900 may be configured to perform the functions described above without the need for code 930. For example, data processing system 935 may consist merely of specialized hardware, such as one or more application-specific integrated circuits (ASICs). Hence, the features of the present invention described above may be implemented in hardware and/or software. For example, in some embodiments, the functional tiers described above may be implemented by data processing system 935 executing computer instructions 930, by data processing system 935 operating independent of any computer instructions 930, or by any suitable combination of hardware and/or software.

DQA systems and methods according to the present invention may be implemented in various platforms. The following examples of DQA implementation are for example only, and are not intended to further limit the invention. A person of skill in the art can appreciate that the invention may be implemented in a variety of platforms.

For example, in a preferred embodiment, a DQA system may be implemented as computer readable program code 930 on a computer readable medium 920 across one or more computers 900. The DQA system, running on one or more computers 900, may access one or more data sources 115 located, for example, locally in the one or more computers' 900 data storage systems 905, or externally through network 910. One motivation to run the data center analytics and dashboard system locally on a computer 800 may be to achieve lower latency and a faster run-time.

In other embodiments, the DQA system may be run on the Internet, accessed by a computer 900 via a connection, such as buses and cables, to network 910. One motivation for an Internet embodiment may be to allow data center analytics and dashboard system to access various Internet based data sources 115, such as cloud-based data sources.

While various embodiments and implementations of the present invention have been described above and claimed, it should be understood that they have been presented by way of example only, and not limitation. For example, the DQA may generate and/or display one or some or all of the analytics described herein. Thus, the breadth and scope of the present invention should not be limited by any of the above-described exemplary embodiments.

The invention claimed is:

1. A computer-implemented method to evaluate data efficacy across an enterprise, comprising:
   indexing a set of data sources that comprise at least one of structured and unstructured data artifacts;
   accessing the indexing on one or more data sources with a computer;
   generating with a computer, a plurality of analytics about the data sources based on the indexing, wherein the analytics generated by the computer include a plurality of:
      a document originality analytic that evaluates originality of data within a corpus of documents;
      a corpus storage volume analytic that provides metrics based on a relative value of data based on facts extracted from the one or more data sources versus facts inferred from the one or more data sources using at least one of models, logic and rules;
      a data source ingest analytic that identifies growth in at least one of ingest rates and update rates;
      a document type analytic that uses document metadata to analyze types of documents in the corpus of documents and provide metrics depicting a number of documents of each of the types in the corpus of documents; and
      an analysis analytic that identifies top entity-to-entity relationships across a set of the one or more data sources; and
   displaying, on a display device connected to the computer, an interactive visualization of results based on the analytics, wherein the visualization on the display device includes at least one of: a histogram, a graph, a timeline, a panel, a chart, a popup, a list, and a table.

2. The method of claim 1, wherein the analytics are further based on one or more analytics clients associated with the one or more data sources.

3. The method of claim 2, wherein the interactive visualization further includes drill-down capabilities based on at least one of the analytics clients and the indexing.

4. The method of claim 1, wherein the plurality of analytics includes the document originality analytic, and wherein said indexing includes:
indexing the data sources based on at least one of the following to generate the document originality analytic: exact text matching, similar fact matching, and data source and data artifact metadata, and
depicting, in the visualization, an original number of sentences for each type of data artifact.

5. The method of claim 1, wherein the plurality of analytics includes the corpus storage volume analytic, further comprising:
indexing the data artifacts of the data sources using at least one of one or more models and logic to generate the corpus storage volume analytic;
extracting one or more of the facts from the data artifacts of the data sources;
inferring one or more of the facts from the data artifacts of the corpus; and
depicting, in the visualization, the one or more facts extracted from the data artifacts, the one or more facts inferred from the data artifacts, a total disk storage required for each of the one or more facts extracted from the data artifacts, and a total disk storage required for each of the facts inferred from the data artifacts.

6. The method of claim 1, wherein the plurality of analytics includes the data source ingest analytic, further comprising:
deriving metadata at at least one of a time of upload and ingest of the data sources, wherein the step of indexing further includes indexing the data source and data artifact metadata, and
determining growth in at least one of the ingest rates and the update rates based on the indexed metadata to generate the data source ingest analytic.

7. The method of claim 1, wherein the plurality of analytics includes the document type analytic, further comprising:
identifying a type of data artifacts in the data sources based on metadata associated with each data artifact to generate the document type analytic.

8. The method of claim 1, wherein the plurality of analytics includes the analysis analytic, further comprising:
determining, using at least one of one or more models and logic, as well as entities, relationships, sentences, and derived content in the data artifacts to generate the analysis analytic;
generating statistics on the entities, relationships, sentences, and derived content across the data artifacts, wherein the visualization further includes a depiction of the statistics, such as top entities, top relationships, top documents based on the derived content, and top sentences.

9. The method of claim 1, wherein the one or more data sources comprise at least one of a large-scale cloud based data source.

10. A system to evaluate data efficacy across an enterprise, comprising:
a processor;
a display device coupled to said processor;
one or more non-transitory computer memories coupled to said processor storing program instructions executable by said processor to implement a data center analytics and dashboard configured to:
access a set of data sources over a communications network that comprise at least one of structured and unstructured data artifacts;
index the set of data sources;
generate a plurality of analytics about the data sources based on the indexing, wherein the analytics include a plurality of:
a document originality analytic that evaluates originality of data within a corpus of documents;
a corpus storage volume analytic that provides metrics based on a relative value of data based on facts extracted from the data sources versus facts inferred from the data sources using at least one of models, logic and rules;
a data source ingest analytic that identifies growth in at least one of ingest rates and update rates;
a document type analytic that uses document metadata to analyze types of documents in the corpus of documents and provide metrics depicting a number of documents of each of the types in the corpus of documents; and
an analysis analytic that identifies top entity-to-entity relationships across a set of the data sources; and
display, on said display device, an interactive visualization of results based on the analytics, wherein the visualization comprises at least one of: a histogram, a graph, a timeline, a panel, a list, a chart, a popup, and a table.

11. The system of claim 10, wherein the analytics may further be based on analytics clients associated with one or more of the data sources.

12. The system of claim 11, further comprising an input device, wherein said processor is further configured to:
respond to inputs from said input device to display the interactive visualization of results with drill-down capabilities, wherein the drill-down capabilities are based on one or more analytics from at least one of the analytics clients and the indexing.

13. The system of claim 10, wherein the plurality of analytics includes the document originality analytic and said processor is further configured to:
index the data sources based on at least one of the following to generate said document originality analytic: exact text matching, similar fact matching, and data source and data artifact metadata, and,
depict, in the visualization on said display device, an original number of sentences for each type of data artifact.

14. The system of claim 10, wherein the plurality of analytics includes the corpus storage analytic and said processor is further configured to:
index the data artifacts of the data sources, as part of said indexing, using at least one of one or more models and logic to generate the corpus storage volume analytic;
extract one or more of the facts from the data artifacts of said corpus;
infer one or more of the facts from the data artifacts of said corpus; and
depict, in said visualization displayed on said display device, the one or more facts extracted from the data artifacts, the one or more facts inferred from the data artifacts, a total disk storage required for each of the one or more facts extracted from the data artifacts, and a total disk storage required for each of the facts inferred from the data artifacts.

15. The system of claim 10, wherein the plurality of analytics includes the data source ingest analytic and said processor is further configured to:
   derive metadata at at least one of a time of upload and ingest of the data sources and the data artifacts;
   index the derived metadata; and
   determine growth in at least one of the ingest rates and the update rates based on the indexed metadata to generate the data source ingest analytic.

16. The system of claim 10, wherein the plurality of analytics includes the document type analytic and said processor is further configured to:
   identify a type of the data artifacts in the data sources based on metadata associated with each of the data artifacts to generate said document type analytic.

17. The system of claim 10, wherein the plurality of analytics includes an analysis analytic and said processor is further configured to:
   determine, using at least one of one or more models and logic, as well as entities, relationships, sentences, and derived content in the data artifacts to generate said analysis analytic; and
   generate statistics on the determined entities, relationships, sentences, and derived content across the data artifacts, wherein the visualization further comprises a depiction of the statistics, such as top entities, top relationships, top data artifacts based on the derived content, and top sentences.

18. The system of claim 10, wherein one or more of the data sources comprise at least one of a large-scale based data source.

* * * * *